United States Patent
Hyde et al.

(10) Patent No.: US 9,499,069 B2
(45) Date of Patent: Nov. 22, 2016

(54) SYSTEMS AND METHODS FOR ADJUSTING THE POSITION OF A WHEELCHAIR OCCUPANT

(71) Applicant: Elwha LLC, Bellevue, WA (US)

(72) Inventors: Roderick A. Hyde, Redmond, WA (US); Jordin T. Kare, Seattle, WA (US); Eric C. Leuthardt, St. Louis, MO (US); Richard T. Lord, Tacoma, WA (US); Robert W. Lord, Seattle, WA (US); Clarence T. Tegreene, Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/923,140

(22) Filed: Jun. 20, 2013

(65) Prior Publication Data
US 2014/0379224 A1 Dec. 25, 2014

(51) Int. Cl.
| A61G 7/10 | (2006.01) |
| A62B 35/00 | (2006.01) |
| B60N 2/00 | (2006.01) |
| B60N 2/02 | (2006.01) |
| A61G 5/04 | (2013.01) |

(52) U.S. Cl.
CPC .............. *B60N 2/002* (2013.01); *A61G 5/043* (2013.01); *A61G 2200/34* (2013.01); *A61G 2203/14* (2013.01); *A61G 2203/30* (2013.01)

(58) Field of Classification Search
None
See application file for complete search history.

(56) References Cited

U.S. PATENT DOCUMENTS

| 3,137,011 | A | * | 6/1964 | Fischer | 5/86.1 |
| 3,252,704 | A | * | 5/1966 | Wilson | 482/68 |
| 3,640,571 | A | * | 2/1972 | Keropian | 297/464 |
| 4,141,094 | A | * | 2/1979 | Ferguson et al. | 5/85.1 |
| 4,159,010 | A | * | 6/1979 | Mitro | 5/89.1 |
| 4,234,228 | A | * | 11/1980 | Flamm | 297/464 |
| 4,446,587 | A | * | 5/1984 | Jump | 5/83.1 |
| 4,530,122 | A | * | 7/1985 | Sanders et al. | 5/83.1 |
| 4,739,526 | A | * | 4/1988 | Hollick | 5/83.1 |
| 4,858,622 | A | * | 8/1989 | Osterweil | 600/595 |
| 4,903,355 | A | * | 2/1990 | Hickerson | 5/83.1 |

(Continued)

FOREIGN PATENT DOCUMENTS

JP 2009234435 A * 10/2009

OTHER PUBLICATIONS

Machine translation of JP 2009234435 A.*

*Primary Examiner* — John R Olszewski
*Assistant Examiner* — Navid Ziaeianmehdizadeh
(74) *Attorney, Agent, or Firm* — Foley & Lardner LLP

(57) ABSTRACT

A system for adjusting a position of a wheelchair occupant includes a sensor configured to generate sensor data based on the position of the occupant, an adjustable cable system coupled to a support point on the wheelchair and configured to be coupled to a support point on the occupant's clothing, and a processing circuit. The cable system is configured to extend and retract at least one cable to adjust the position of the occupant, and the processing circuit is configured to determine the position of the occupant in the wheelchair based on the sensor data and adjust the cable based on the determined position of the occupant.

34 Claims, 13 Drawing Sheets

(56) References Cited

U.S. PATENT DOCUMENTS

| | | | |
|---|---|---|---|
| 5,165,123 A * | 11/1992 | Colpron | 5/83.1 |
| 5,333,333 A * | 8/1994 | Mah | 5/87.1 |
| 5,379,725 A | 1/1995 | Roberson et al. | |
| 5,395,158 A * | 3/1995 | Cordia | 297/393 |
| 5,551,756 A * | 9/1996 | Gurasich et al. | 297/440.2 |
| 5,642,302 A | 6/1997 | Dumont et al. | |
| 5,713,373 A * | 2/1998 | Argentino | 128/869 |
| 5,930,152 A | 7/1999 | Dumont et al. | |
| 6,076,527 A | 6/2000 | Rottinghaus et al. | |
| 6,213,558 B1 * | 4/2001 | Axelson et al. | 297/464 |
| 6,513,824 B2 * | 2/2003 | DuBose | 280/304.1 |
| 6,578,594 B1 * | 6/2003 | Bowen et al. | 135/67 |
| 6,588,792 B1 * | 7/2003 | Koerlin et al. | 280/650 |
| 6,679,510 B2 * | 1/2004 | Perena | 280/250.1 |
| 7,026,940 B2 * | 4/2006 | Cherubini | 340/573.1 |
| 7,322,651 B2 * | 1/2008 | Makhsous et al. | 297/284.6 |
| 7,461,897 B2 * | 12/2008 | Kruse et al. | 297/330 |
| 7,472,956 B2 | 1/2009 | Makhsous et al. | |
| 7,510,539 B2 * | 3/2009 | Katane et al. | 602/36 |
| 7,845,665 B2 * | 12/2010 | Borisoff | 280/250.1 |
| 7,905,553 B2 * | 3/2011 | Lichtner | 297/465 |
| 7,938,756 B2 * | 5/2011 | Rodetsky et al. | 482/69 |
| 8,007,046 B2 * | 8/2011 | Rothschild | 297/485 |
| 8,127,875 B2 * | 3/2012 | Mattes et al. | 180/65.8 |
| 8,572,774 B1 * | 11/2013 | Osika | 5/83.1 |
| 2002/0000706 A1 * | 1/2002 | DuBose | 280/304.1 |
| 2002/0026130 A1 * | 2/2002 | West | 601/23 |
| 2003/0090089 A1 * | 5/2003 | Koerlin et al. | 280/650 |
| 2003/0098190 A1 * | 5/2003 | Kanno et al. | 180/65.6 |
| 2004/0130452 A1 * | 7/2004 | Cherubini | G08B 21/22 340/573.7 |
| 2004/0143198 A1 * | 7/2004 | West | 601/5 |
| 2004/0232268 A1 * | 11/2004 | Karwaczynski | 242/390.9 |
| 2006/0192362 A1 | 8/2006 | Makhsous et al. | |
| 2008/0097254 A1 * | 4/2008 | Torres et al. | 601/23 |
| 2013/0054106 A1 * | 2/2013 | Schmudderich | B60W 30/0956 701/96 |
| 2013/0205466 A1 * | 8/2013 | Arnold | 2/83 |

* cited by examiner

SYSTEMS AND METHODS FOR ADJUSTING THE POSITION OF A WHEELCHAIR OCCUPANT

BACKGROUND

Many individuals require the assistance of a wheelchair to be mobile. In general, the wheelchair is manually powered by an occupant or caregiver, or the wheelchair is propelled by motors. In a typical scenario, a caregiver may be pushing a patient in a wheelchair throughout a health care facility. In another scenario, the patient may be controlling a motorized wheelchair. As the chair moves about, the wheelchair occupant may gradually slip downward or otherwise shift positions within the chair. However, the caregiver may not be aware that the occupant has slipped or moved to an improper position within the chair. The occupant may not have the physical strength or ability to reposition themselves within the chair. The occupant must then wait for assistance from the caregiver.

SUMMARY

One embodiment relates to a system for adjusting a position of a wheelchair occupant including a sensor configured to generate sensor data based on the position of the occupant, an adjustable cable system coupled to a support point on the wheelchair and configured to be coupled to a support point on the occupant's clothing, and a processing circuit. The cable system is configured to extend and retract at least one cable to adjust the position of the occupant, and the processing circuit is configured to determine the position of the occupant in the wheelchair based on the sensor data and adjust the cable based on the determined position of the occupant.

Another embodiment relates to a method of adjusting a position of a wheelchair occupant. The method includes connecting an adjustable cable system to clothing of the occupant, where the cable system is coupled to a support point on the wheelchair and configured to be coupled to a support point on the occupant's clothing, and where the cable system is configured to extend and retract at least one cable to adjust the position of the occupant. The method further includes generating sensor data with a sensor, where the sensor data is based on the position of the occupant, determining the position of the occupant in the wheelchair based on the sensor data, and adjusting the cable based on the determined position of the occupant.

Another embodiment relates to a non-transitory computer-readable medium having instructions stored thereon, the instructions forming a program executable by a processing circuit to adjust a position of a wheelchair occupant. The instructions include instructions for receiving sensor data from a sensor, where the sensor data is based on the position of the occupant, instructions for determining the position of the occupant in the wheelchair based on the sensor data, and instructions for controlling an adjustable cable system to adjust a cable based on the determined position of the occupant, where the cable system is coupled to a support point on the wheelchair and configured to be coupled to a support point on the occupant's clothing, and where the cable system is configured to extend and retract at least one cable to adjust the position of the occupant.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
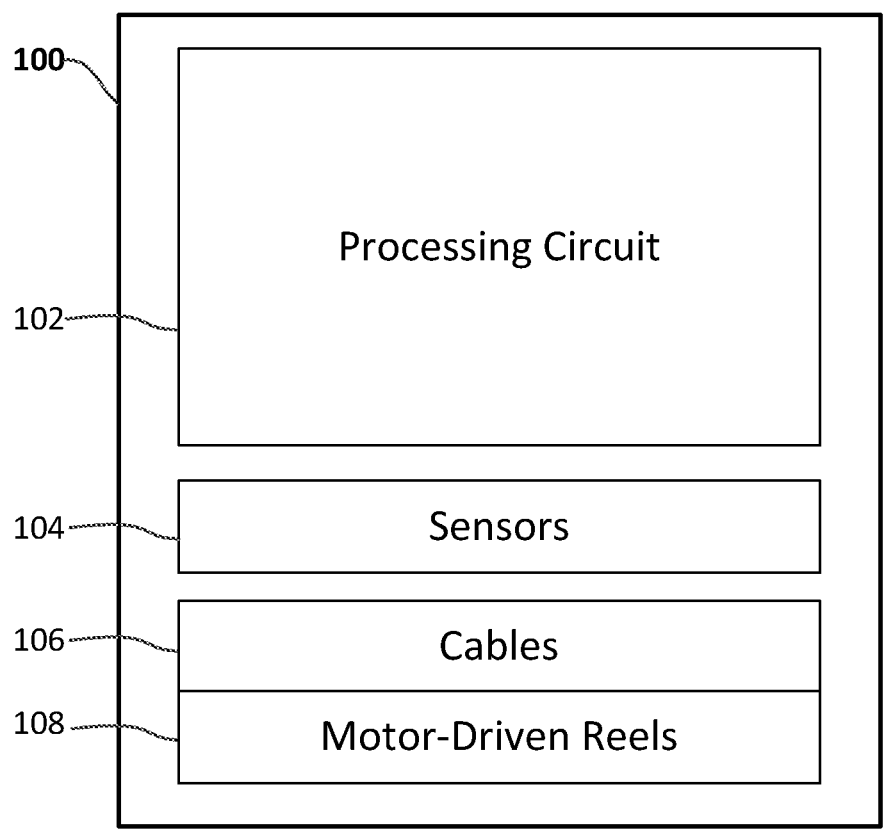
FIG. 1 is a block diagram of a system for adjusting the position of a wheelchair occupant according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, various embodiments for adjusting the position of a wheelchair occupant are shown and described. Often, as an occupant of a wheelchair moves about, the occupant gradually slips downward in the chair. In other situations, the occupant may shift to the left and right as the chair turns. In other situations, the occupant may slouch or have a posterior pelvic tilt, etc. The occupant may not have the strength or capability to reposition himself or herself within the chair. In that case, the occupant must contact a caregiver for assistance or wait until a caregiver notices the situation and provides assistance. In one embodiment, a wheelchair may be equipped with cables (e.g., tensile cables) that are configured to attached to support points on the chair and support points on the clothing (e.g., a shirt, a jacket, pants, a harness, etc.) worn by the occupant. In one embodiment, the support points include a cable adjustment system having controllable motor-driven reels that are capable of reeling the cables in and out in order to dynamically adjust the length and tension of the extended cable between the chair and the occupant. In another embodiment, the cables may be adjusted by a system other than motor-driven reels (e.g., a rack and pinion system, a lever-based system, etc.). A processing circuit may analyze data provided by sensors to determine the position of the occupant in the chair. The processing circuit may adjust the cables via the cable adjustment system. For example, when an occupant slips out of proper position, the processing circuit may generate the necessary commands to cause controllable motors to reel the cables in, decreasing the extended portion of the cable in length, and pulling the occupant back into a proper position. When the occupant is not in the proper position or the occupant has been repositioned, an alert may be generated by the processing circuit in order to bring the situation to the attention of a caregiver.

The systems described herein may be enabled or disabled by a user as desired. Additionally, a user may specify preferences in order to set cable tension settings, positioning settings, and operating modes, etc. User preferences and settings may be stored in a preference file. Default operating values may also be provided. Although the systems described herein refer to being installed on a wheelchair, other medical vehicles and embodiments (e.g., mobility scooters, hospital beds, etc.) are envisioned. The systems described herein are not limited to use with a wheelchair.

Referring to FIG. 1, a block diagram of system 100 for adjusting the position of a wheelchair occupant is shown. According to one embodiment, system 100 includes processing circuit 102, and sensors 104 for sensing information related to the occupant's position and providing the information to processing circuit 102. System 100 also includes cables 106 and motor-driven reels 108. Sensors 104 include all sensing components necessary for sensing the position of a wheelchair occupant. Sensors 104 may include a single sensor device, or multiple sensors. Sensors 104 may be imaging sensors, cameras, laser sensors, radar sensors, RFID sensors, infrared sensors, optical sensors, pressure sensors, capacitive sensors, cable sensors, etc., or any combination of sensors. Sensors 104 are communicably coupled to processing circuit 102. Processing circuit 102 analyzes the sensor data and determines a position of the occupant based on the sensor data. Processing circuit 102 makes a determination of whether the position of the occupant needs to be changed or maintained, and adjusts cables 106 appropriately. The lengths of the extended portions of cables 106 may be adjusted by controlling the operation of corresponding motor-driven reels 108. A wheelchair may be equipped with a single cable or multiple cables 106. Cables 106 may be any cable capable of adjusting the position of an occupant as described herein (e.g., tensile cables, steel-wire wound cables, Kevlar® fiber cables, nylon braided lines, synthetic fiber ropes, etc.). Cables 106 are not limited to a particular gauge or material. Cables 106 are configured to attached to support points on the wheelchair and support points on the occupant's clothing (e.g., with a clip, fastener, or other attachment device, etc.).

In one embodiment, processing circuit 102 is a computing device integrated into a wheelchair and sensors 104 include a wide-field-of-view camera. The wheelchair includes cables 106 that are connected to an occupant's harness. Processing circuit 102 accepts input from the camera and analyzes the images to determine when an occupant has slipped down into an improper position. When an improper position is detected, processing circuit 102 causes cables 106 to adjust (e.g., decrease in extended length, increase tautness, etc.) by controlling corresponding motor-driven reels 108. The motor-driven reels 108 wind up lengths of cables 106 as controlled by processing circuit 102 until the occupant is pulled into a proper position. The proper and improper positions may be calculated by processing circuit 102, or may be predefined and stored in a configuration file. The proper and improper positions may include intermediate positions that an occupant may encounter.

In one embodiment, processing circuit 102 is a computing device coupled to a wheelchair and sensors 104 include capacitance and pressure sensors integrated throughout the seat of the chair. The wheelchair includes cables 106 that are connected to an occupant's shirt. Processing circuit 102 accepts input from the sensors to determine a position of the occupant. Processing circuit 102 compares the position to a defined proper and/or improper position. When the occupant is not in a proper position, processing circuit 102 causes the extended portions of cables 106 to decrease in length by controlling corresponding motor-driven reels 108. The motor-driven reels 108 wind up lengths of cables 106 as controlled by processing circuit 102 until the occupant is pulled into a proper position. Cables 106 may be controlled individually or in groups, and an occupant may be shifted to intermediate positions as the occupant is pulled into a proper position (e.g., various steps and corrections may be applied by cables 106 as controlled by processing circuit 102 prior to the occupant being shifted into the proper position). The amount that cables 106 are retracted is based on the difference between the occupant's position and a proper position. For example, if an occupant has slipped five inches down the chair further than the occupant should be, processing circuit 102 may decrease the extended length of a cable 106 by five inches. As another example, if an occupant has slipped sideways towards the left side of the chair further than the occupant should be, processing circuit 102 may decrease the extended length of rightward cable 106.

In one embodiment, processing circuit 102 allows motor-driven reels 108 to extend and retract the length of cables 106 a certain amount in order to allow the occupant to have a range of motion. The range of motion permits the occupant to have some freedom to move without being rigidly affixed to the chair. Processing circuit 102 may adjust cables 106 and control motor-driven reels 108 such that a fixed tension is maintained on cables 106.

In one embodiment, processing circuit 102 adjusts cables 106 in a manner necessary to maintain the occupant in his or her current position. Processing circuit 102 may cause the motor-driven reels 108 to extend and retract cables 106 a certain amount as the occupant begins to move or shift in order to restrain the movement. Processing circuit 102 may adjust a certain cable 106 individually, or may adjust a group of cables 106. Processing circuit 102 makes such adjustments based on the data from sensors 104 related to the position of the occupant.

In one embodiment, processing circuit 102 makes a determination of whether to adjust the position of the occupant based on motion information. For example, a speed sensor may provide the speed of the wheelchair to processing circuit 102, and adjustment of cables 106 may be based on the speed. As another example, an accelerometer or gyroscope device provides motion data to processing circuit 102, and adjustment of cables 106 may be based on the motion characteristics of the wheelchair. In one embodiment, processing circuit 102 makes a determination of whether to adjust the position of the occupant based on user input. For example, processing circuit 102 may receive a user command to reposition the occupant, and adjustment of cables 106 may be based on the user command.

Figure 2:
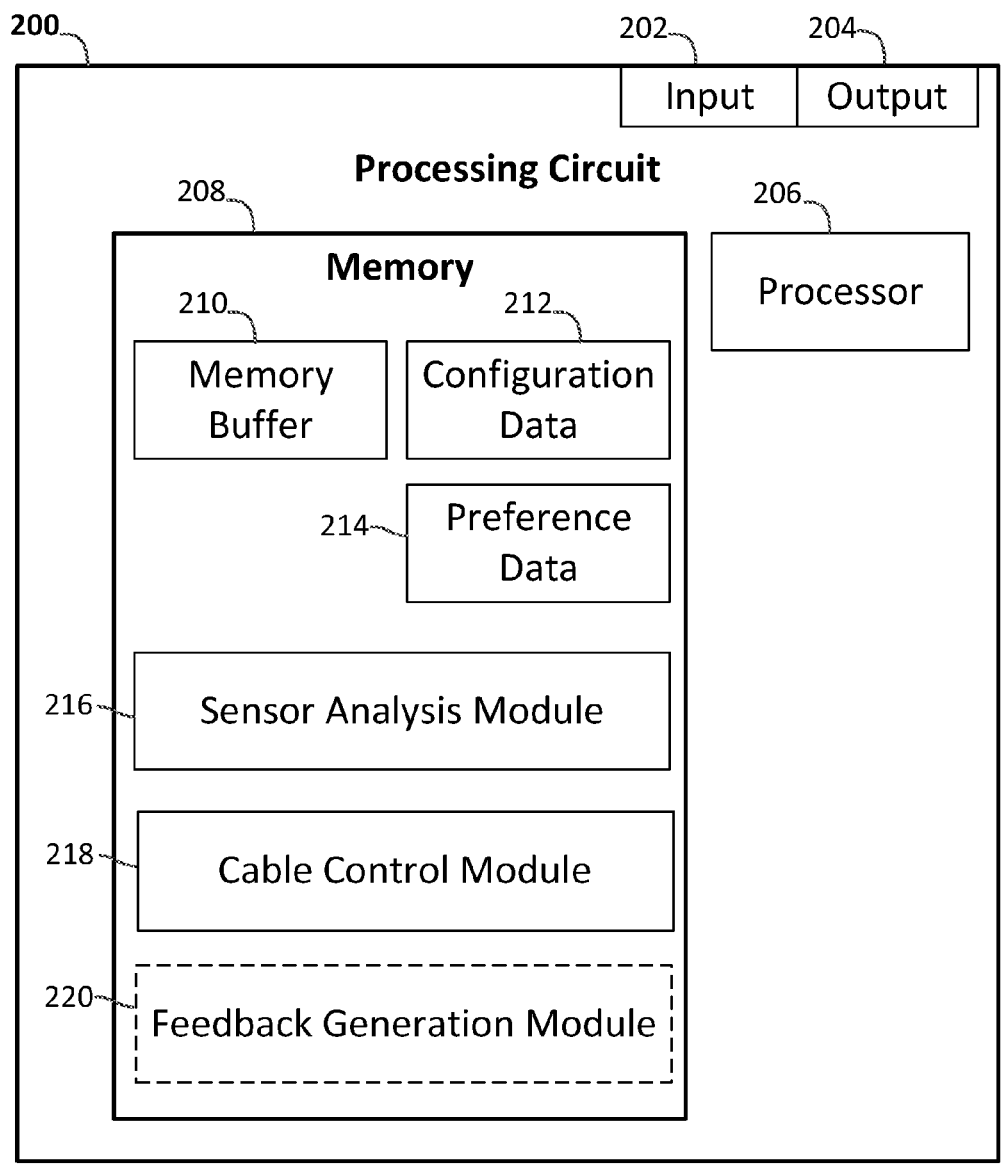
FIG. 2 is a block diagram of a processing circuit according to one embodiment.

Referring to FIG. 2, a detailed block diagram of processing circuit 200 for completing the systems and methods of the present disclosure is shown according to one embodiment. Processing circuit 200 may be processing circuit 102 of FIG. 1. Processing circuit 200 is generally configured to accept input from at least one sensor. Processing circuit 200 is further configured to receive configuration and preference data. Input data may be accepted continuously or periodically. Processing circuit 200 uses the input data to determine a position of the occupant, and to determine whether to adjust (or maintain) the position of the occupant using cables. Processing circuit 200 analyzes data provided by the sensor(s) to determine when the occupant shifts to an improper positions within the chair. Improper positions may correspond to specific locations, positions where the occupant's extremities may be protruding, positions where the occupant has slipped down within the chair, etc. Improper positions may be adjusted or customized for a particular occupant, or may be general positions. Thresholds and offsets may be used in setting proper and improper positions. Processing circuit 200 may also predict when an occupant is likely to shift based on the speed and motion of the chair. For example, motion of the wheelchair may include an angular motion, a rotational motion, an impending motion, or a predicted motion, etc. Processing circuit 200 may also calculate inertial forces of the patient and/or wheelchair due to motion of the wheelchair. Based on this analysis, procession circuit 200 generates the signals necessary to extend or retract the cables coupled to the occupant, or to maintain certain cable tensions. In performing this analysis and in adjusting the positioning of an occupant, processing circuit 200 may make use of machine learning, artificial intelligence, interactions with databases and database table look-ups, pattern recognition and logging, intelligent control, neural networks, fuzzy logic, etc.

According to one embodiment, processing circuit 200 includes processor 206. Processor 206 may be implemented as a general-purpose processor, an application specific integrated circuit (ASIC), one or more field programmable gate arrays (FPGAs), a digital-signal-processor (DSP), a group of processing components, or other suitable electronic processing components. Processing circuit 200 also includes memory 208. Memory 208 is one or more devices (e.g., RAM, ROM, Flash Memory, hard disk storage, etc.) for storing data and/or computer code for facilitating the various processes described herein. Memory 208 may be or include non-transient volatile memory or non-volatile memory. Memory 208 may include database components, object code components, script components, or any other type of information structure for supporting the various activities and information structures described herein. Memory 208 may be communicably connected to processor 206 and include computer code or instructions for executing the processes described herein (e.g., the processes shown in FIGS. 8-13).

Memory 208 includes memory buffer 210. Memory buffer 210 is configured to receive a data stream from a sensor (e.g. sensors 104, speed sensor, accelerometer, motion detector, etc.) through input 202. For example, the data may include a real-time stream of data from a camera, etc. The data received through input 202 may be stored in memory buffer 210 until memory buffer 210 is accessed for data by the various modules of memory 208. For example, sensor analysis module 216, cable control module 218, and feedback generation module 220 each can access the data that is stored in memory buffer 210.

Memory 208 further includes configuration data 212. Configuration data 212 includes data relating to processing circuit 200. For example, configuration data 212 may include information relating to interfacing with other components (e.g., sensors 104, controllable motor-driven reels 108, components of processing circuit 200, etc.). For example, configuration data 212 may include default values required to initiate the device and initiate communication with the sensors or peripheral systems. Configuration data 212 may include the command set needed to interface with a computer system used transfer user settings or otherwise set up the system. This may include the command set needed to generate graphical user interface (GUI) controls, menus, and visual information. For example, processing circuit 200 may format visual information to generate visual alerts for display on a display device. Configuration data 212 may include the command set needed to interface with communication components (e.g., a universal serial bus (USB) interface, a Wi-Fi interface, an Ethernet interface, etc.). For example, processing circuit 200 may format data for transmission (e.g., via Wi-Fi) to a remote terminal. Processing circuit 200 may also format data for output via output 204 to allow a user to configure the systems as described herein. Processing circuit 200 may also format audio data for output via output 204 to allow a speaker to create sound.

Processing circuit 200 further includes input 202 and output 204. Input 202 is configured to receive a data stream (e.g., a digital or analog stream of data from sensors), configuration information, and preference information. Output 204 is configured to provide an output to a controllable motor-driven reel, a feedback device, or components of the systems as described herein.

Memory 208 further includes modules 216, 218, and 220 for executing the systems and methods described herein. Modules 216, 218, and 220 are configured to receive sensor data, configuration information, user preference data, and other data as provided by processing circuit 200. Modules 216, 218, and 220 are generally configured to analyze sensor data, determine the position of a wheelchair occupant, determine if the occupant is in a correct position, and adjust or maintain the extension lengths of cables by controlling motor-driven reels affixed to cables. Modules 216, 218, and 220 may be further configured to operate according to a user's preferences. In this manner, certain thresholds and operational modes may be adjusted according to a user's desires.

Sensor analysis module 216 is configured to receive sensor data from various sensors (e.g., sensors 104 of FIG. 1, speed sensors, motion sensors, etc.). The sensor data may include distance related data, orientation related data, a range, or general 3-D spatial information. The sensor data may be provided through input 202 or through memory buffer 210. Sensor analysis module 216 scans the sensor data and analyzes the data to detect the position of the occupant within the chair. Detection of the position of the occupant may include detection of extremities of the occupant. Sensor analysis module 216 may further determine the particular type of extremity (e.g., arm, leg, foot, head, hand, etc.) and base a position determination on the location of a particular extremity. Sensor analysis module 216 analyzes the occupant's position to determine whether the occupant has slipped downward within the chair, or whether the occupant has otherwise shifted in position such that repositioning is necessary. Sensor analysis module 216 may compare the occupant's position to stored proper positions in the chair.

Such proper positions may be stored in configuration data 212 or preference data 214. Proper positions may be provided when the system of processing circuit 200 is initially configured. Proper and/or new positions may be also added later by a user, or automatically determined by sensor analysis module 216. For example, positions may be determined in order to counteract a sliding occupant, a displaced occupant, falling occupant, shifting occupant, etc. Positions may also be determined in order to prevent an occupant from being displaced, sliding, falling, shifting, etc. Positions may be also added later by the user approving of his current position and designating it as a proper position. Sensor analysis module 216 may compare the occupant's position to stored improper positions in the chair. Such improper positions may be stored in configuration data 212 or preference data 214. Improper positions may be provided when the system of processing circuit 200 is initially configured. Improper positions may be also added later by a user, or automatically determined by sensor analysis module 216. Improper positions may be also added later by the user disapproving of his current position and designating it as an improper position. Sensor analysis module 216 may compare the occupant's position to the dimensions of the chair. Such dimension information may be based on a model of the chair stored in configuration data 212 or preference data 214. A chair model may be pre-stored or determined by sensor analysis module 216.

Sensor analysis module 216 generally determines the position of an occupant and whether the occupant should be repositioned, or have their position maintained through a variety of methods. A particular method may correspond to the type of sensors in use. Any of the methods of detection discussed herein may be combined or used individually.

In one embodiment, sensor analysis module 216 computes an amount of misalignment of the occupant within the chair. Sensor analysis module 216 bases a determination of whether to reposition the occupant on the misalignment amount. Misalignment amounts may be based on the location of a single body part within the chair, or the location of multiple body parts. Misalignment amounts may include distances, percentages, averages, etc. As an example, sensor analysis module 216 may compute the distance an occupant's shoulder or head is from the top (or other point of reference) of the chair. If the distance is greater than a certain threshold, sensor analysis module 216 may determine that the occupant has slipped down the chair. If the distance is within the threshold, sensor analysis module 216 may determine that the occupant is already in a correct position, and should have his or her position maintained. Thresholds and offsets may be used to customize the systems described herein for a particular occupant. Sensor analysis module 216 may also determine proportions of a particular occupant, and utilize the proportion values to customize these systems. Sensor analysis module 216 may also receive input (via input 202) from cable sensors coupled to the motorized-reels. This data may include information related to cable tension, cable extension length (e.g., how far the cable is reeled in or out), cable direction, and stress values, etc. Sensor analysis module 216 may determine that an occupant is an improper position based the data from the cable sensors.

In one embodiment utilizing a wide-field-of-view camera, sensor analysis module 216 receives image data. Sensor analysis module 216 analyzes the image data to detect the occupant's position using body detection algorithms. As the body of the occupant is detected, sensor analysis module 216 compares the location of various extremities to the wheelchair (or to a model of the wheelchair). If the occupant's body indicates that has slipped down or has shifted to an improper position, sensor analysis module calculates the amount the cables need to be adjusted in order to correct the occupant's position. Sensor analysis module 216 may calculate intermediate steps or positional adjustments to be made to the occupant during correction of the occupant's position. Sensor analysis module 216 sends these values to cable control module 218, which generates commands necessary to adjust the appropriate cables (e.g., commands to cause the corresponding motor-driven reel to activate, etc.). For example, such values may include distances the occupant has shifted in the chair determined from a particular point on the occupants body, or determined from support/mounting locations of the cables on the occupant. An amount that an occupant may shift before being considered to be within an improper position may be adjusted (e.g., through thresholds stored in configuration data 212 or preference data 214). As another example, sensor analysis module 216 may send information identifying a particular motor-driven reel to activate, and values corresponding to activating the reel (e.g., tension settings, adjustment amounts, etc.).

In one embodiment utilizing optical/laser link sensors, sensor analysis module 216 receives data related to objects crossing the path of the optical/laser links. For example, if the optical links are arranged around the perimeter of the wheelchair, the sensors may provide a signal to sensor analysis module 216 when the occupant's leg crosses the optical link and protrudes outside the contour of the wheelchair. Such optical systems may be used in conjunction with other sensors described herein. For example, after an optical link sensor is triggered, a camera sensor may be used to determine an amount that the occupant has shifted through analysis of image data provided by the camera sensor. As another example, capacitive and pressure sensors may be used to determine the general position of an occupant in the medical device. Such pressure and capacitive sensors may be mounted in the seat and the backrest areas of the wheelchair. Sensor analysis module 216 may analyze the position data and compare it to models of the human body to estimate an amount that the occupant has shifted in the chair based on knowledge of body interconnectivity (e.g., the hand is connected to the forearm, etc.). The models of the human body may be general models according to average human proportions, or may be tailored to the dimensions of a particular occupant. Such models may be stored in configuration data 212 or preference data 214. In some embodiments, sensor analysis module 216 may be configured to determine the occupant's position based on pressure or capacitive data alone.

In one embodiment utilizing sensors coupled to the occupant, sensor analysis module 216 may monitor sensor data for indications that an occupant has shifted within the wheelchair to an improper position. For example, an RFID sensor system may be mounted throughout the perimeter of the wheelchair, and the occupant may have RFID tags coupled (e.g., with a wristband, etc.) to her wrists and ankles. If the RFID tag crosses the bounds of the RFID sensor system, the RFID system can provide appropriate data to the sensor analysis module 216, which may then determine that the occupant has slipped down the chair and should be repositioned. This determination may be may in conjunction with knowledge of the occupant's body position as discussed above, or may be dependent solely on the RFID tag crossing the RFID sensor. Additionally, some RFID sensor systems are capable of determining a distance from an RFID tag as discussed above. Such distance information may be utilized by sensor analysis module 216 in determining the positioning of the occupant, and whether the occupant has moved to an improper position.

In one embodiment utilizing infrared sensors, sensor analysis module 216 may analyze heat map data corresponding to the heat signature of an occupant. Sensor analysis module 216 scans the heat map to determines the position of the occupant, and then compares the position to the dimensions of the wheelchair. If the occupant is determined to be improperly location within the chair, sensor analysis module 216 may determine that the occupant may need to be moved.

In one embodiment, sensor analysis module 216 receives motion data related to the motion of the wheelchair. Motion data may be provided by various motion sensors, accelerometers, gyroscope device, etc., coupled to the wheelchair. For example, as the wheelchair moves quickly (e.g., longitudinally, laterally, angularly, etc.), sensor analysis module 216 may provide commands to cable control module 218 in order to better secure the occupant in his or her position. This may include commands for increasing cable tensile limits, increasing cable tension values, or decreasing the extension length of a cable, etc. As another example, as the wheelchair moves slowly, sensor analysis module 216 may provide commands to cable control module 218 in order to allow the occupant more freedom of motion. This may include commands for decreasing cable tensile limit values, decreasing cable tension values, or increasing the extension length of a cable, etc. In one embodiment, sensor analysis module 216 monitors the actual motion of the wheelchair, and predicts a future movement/motion. In another embodiment, the wheelchair can be automatically moved using an automatic motion control system, and sensor analysis module 216 monitors the planned route of the wheelchair, and predicts a future movement. In some embodiments, a map indicating pathways, doorways, obstacles, or the like may be used to predict future movement. Sensor analysis module 216 may determine whether to reposition or secure an occupant based on the predicted movement.

In one embodiment, sensor analysis module 216 may receive a user command via input 202 specifying that the occupant should be repositioned. The user command may be provided by a user interface or input device on the wheelchair or from a remote terminal. The user command may specify a particular position in which to move the occupant, or the command may be more general such that the occupant is repositioned to a stored proper position. The user command may also provide cable length values, tension values, tensile limits, etc., or other values related to moving the occupant. Sensor analysis module 216 may receive the command and compare the desired occupant position to the current position. Based on the difference in positions, sensor analysis module 216 provides appropriate values to cable control module 218 such that the occupant is moved by the systems described herein.

In one embodiment, sensor analysis module 216 is configured to function according to an active mode. While in the active mode, sensor analysis module 216 may perform the position analysis as discussed above and actively cause cable control module 218 to decrease the extended lengths of the cables in order to move the occupant. Sensor analysis module 216 may provide tensile limits to cable control module 218 to govern the control of the cables. Such tensile limits may be defined as configuration values or default values, and may be customized for a particular occupant. The tensile limits may be selected in order to avoid harming the occupant as a cable is reeled in. For example, a cable may be adjusted only while the detected cable tension is within the tensile limit. In the event the cable tension exceeds the cable limit, cable control module 218 may cease adjusting the cable, or allow the cable to extend, thereby providing slack and relieving the cable tension. In one embodiment, cable control module 218 may adjust the rate of a cable length adjustment speed (e.g., slow down a repositioning of the occupant) in order to maintain the cable tension at or below the cable limit. In one embodiment, stress sensors are coupled to the occupant, the cable support/mounting points, the occupant's clothing, a harness, or on the cables. Data from the stress sensors may be used to set or adjust tensile limits in real-time. Data from the stress sensors may also be used by sensor analysis module 216 while adjusting the cables according to any of the methods described herein. For example, stress sensor data may be used as a safety mechanism, wherein any cable adjustments are stopped when a certain stress level is detected.

In one embodiment, sensor analysis module 216 is configured to function according to a passive mode. While in the passive mode, sensor analysis module 216 may perform position analysis as discussed above, and allow cable control module 218 to increase or decrease the extended length of a cable in order to accommodate movement of the occupant. A maximum extension length may be provided as configuration or default values, or may be set by a user. The maximum extension length may be used to limit how far an occupant may move. Additional, a tension value may be provided to cable control module 218, which may use the tension value to maintain a fixed tension in a cable. In this manner, sensor analysis module 216 may provide a tension value such that movement of the occupant is not impeded, but the cables are maintained in a taut configuration. Tension values may be defined as configuration or default values, or may be customized for a particular occupant.

Cable control module 218 is configured to receive data from sensor analysis module 216 related to adjustments to be applied to the cables. Data may include position information, cable length information, cable direction information, particular cables to be adjusted, cable tension settings, tensile limits, stress limits, cable adjustment rates, etc. Cable control module 218 generates the control signals necessary to control a motor-driven reel that is attached to a cable. Cable control module 218 may generate a control signal as defined by a particular motor-driven reel in use. For example, cable control module 218 may cause a reel to turn in one direction, thereby increasing the length of the extended portion of the attached cable between the wheelchair and the occupant. As another example, cable control module 218 may cause a reel to turn the opposite direction, thereby decreasing the extended length of the attached cable. As another example, cable control module 218 may cause a reel to turn with a certain resistance level in order to maintain a certain tension in the attached cable. As another example, cable control module 218 may cause a reel to turn at a certain rate. As another example, cable control module 218 may cause a reel to cease turning. As another example, cable control module 218 may cause a reel turn for a certain duration of time necessary to extend or retract a length of cable. Cable control module 218 may control each motor-driven reel (and attached cable) individually, or cable control module 218 may control groups of reels (and attached cables) at the same time. Cable control module 218 may provide feedback to other modules of processing circuit 200. For example, if a reel malfunctions, cable control module 218 may inform sensor analysis module 216, which may adjust its algorithms to compensate for the inoperative reel.

In one embodiment, processing circuit 200 may be configured to provide feedback related to adjusting the position of a wheelchair occupant. Processing circuit 200 may generate such feedback via feedback generation module 220. Feedback generation module 220 receives data from sensor analysis module 216 and cable control module 218 related to adjustments made to the cables and the position of the occupant. This data may include amounts an occupant has been moved, amounts a cable has been adjusted, tension values, stress sensor values, the current position of the occupant within the chair, etc. Based on the received data, feedback generation module 220 generates feedback (e.g., an alert) to be output via a feedback device. Feedback devices may include display devices, network devices, audio devices, mechanical devices, etc. For example, in one embodiment, upon pulling an occupant up in the wheelchair after the occupant had slipped down in the wheelchair, feedback generation module 220 generates a user interface alert to be output on a display screen. The alert may be displayed on a screen coupled to the wheelchair, or the alert may be transmitted (e.g., via a wireless network) to a remote terminal. Such a user interface warning may include details related to moving the occupant (e.g., "Occupant has slipped in the chair and has been actively repositioned!"). In another embodiment, feedback generation module 220 generates signals necessary to create an audio alert (e.g., a beep, a siren sound, etc.) to be output on a speaker. In another embodiment, feedback generation module 220 generates the signals necessary to cause a light to flash. In another embodiment, feedback generation module 220 generates signals necessary to cause a mechanical feedback device to vibrate. Such a vibration may be selected to be detectable by the wheelchair's occupant (e.g., on armrests or a seat). Such a vibration may be selected to be detectable by a person pushing the wheelchair, (e.g., via a wheelchair's handles). It should be understood that the scope of the present application is not limited to a particular type of warning or feedback device, and embodiments may be configured to work with multiple types of feedback devices. By using such feedback devices, a caretaker, the occupant, or other individual may notice that the occupant has shifted to an improper position with in the chair. Any of the feedback mechanisms and warnings described herein may be customized according to feedback profiles or user preferences, which may be stored in configuration data 212 or preference data 214.

Figure 3:
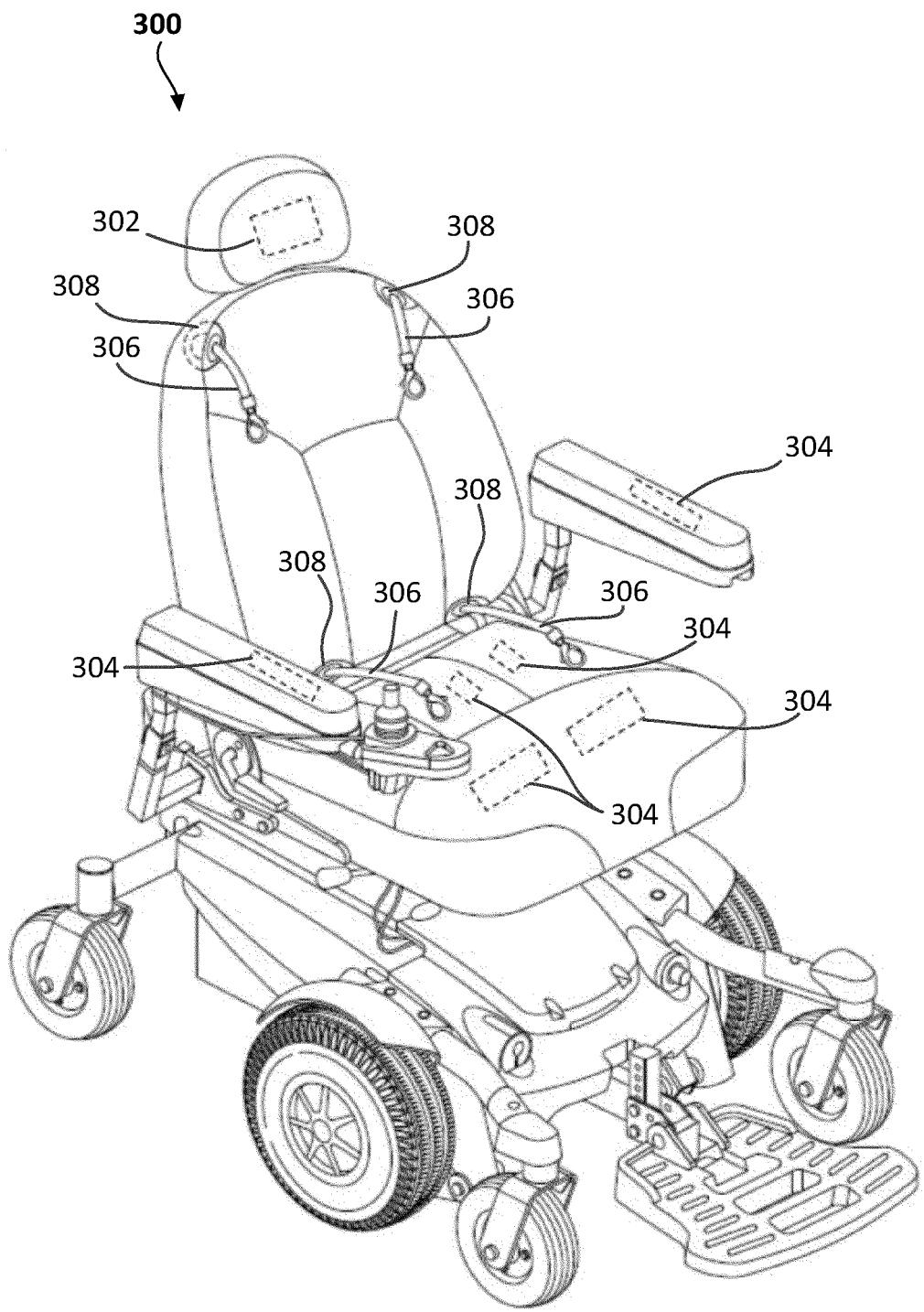
FIG. 3 is a schematic diagram of a wheelchair including a system for adjusting the position of a wheelchair occupant according to one embodiment.

Referring to FIG. 3, a schematic diagram of wheelchair 300 is shown according to one embodiment. Wheelchair 300 has been equipped with the systems described herein and includes processing circuit 302, sensors 304, cables 306, and motor-driven reels 308. Processing circuit 302 may be embedded within the wheelchair or may be part of the wheelchair's control systems. Sensors 304 may include various sensors coupled to wheelchair 300 or affixed to an occupant of wheelchair 300. In one embodiment, sensors 304 include a camera and multiple optical sensors. In another embodiment, sensors 304 include pressure sensors and capacitive sensors. In another embodiment, sensors 304 include RFID sensors and a camera. In another embodiment, sensors 304 include a radar sensor. In another embodiment, sensors 304 include an infrared sensor. In another embodiment, sensors 304 include optical link sensors. In another embodiment, sensors 304 include cable sensors. The scope of the present application is not limited to a particular arrangement or selection of sensors. Cables 306 are depicted at four locations on wheelchair 300 and are connected to corresponding support points including motor-driven reels 308, embedded within the chair at the support points. The scope of the present application is not limited to a particular arrangement or number of cables/motor-driven reels. In one embodiment, the motor-driven reels 308 are external to the chair. In one embodiment, motor-driven reels 308 are located in the occupant's clothing or harness, and are communicably connected to processing circuit 302 via wireless or wired means (e.g., a communication link from the occupant's clothing/harness to processing circuit, etc.). In one embodiment, motor-driven reels 308 are located on the cables themselves. In one embodiment, the attachment devices (clasps, clips, hooks, etc.) at the ends of cables 306 are controllable and may be configured to automatically connect or disconnect. The attachment devices may be controlled by processing circuit 302 to activate (and attach) or deactivate (and disconnect). For example, if the sensor analysis module of processing circuit 302 detects that the wheelchair has not been in motion for a period of time, or has arrived at a destination, it may generate signals to cause the attachment devices to disconnect and allow the occupant to leave the chair. As another example, upon receiving a user command to connect or disconnect the cables, the sensor analysis module of processing circuit 302 may generate the necessary commands to fulfill the user command.

Figure 4:
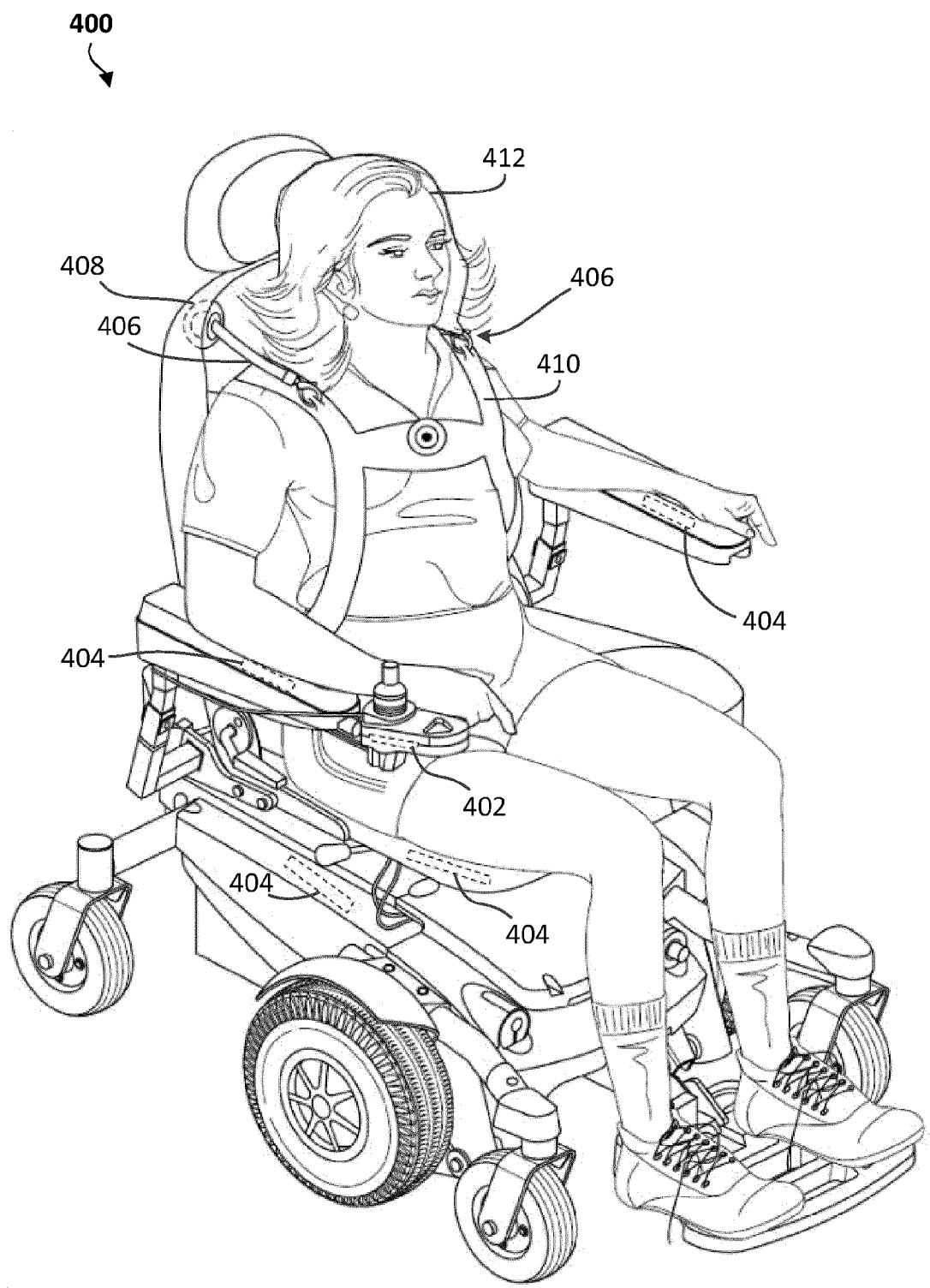
FIG. 4 is a schematic diagram of a wheelchair including a system for adjusting the position of a wheelchair occupant according to one embodiment.

Referring to FIG. 4, a schematic diagram of wheelchair 400 is shown according to one embodiment. Wheelchair 400 has been equipped with the systems described herein and includes processing circuit 402, sensors 404, cables 406, and motor-driven reels 408. Processing circuit 402 is depicted as being part of the control systems of the wheelchair. Sensors 404 include various sensors coupled to wheelchair 400. As depicted, sensors 404 may include a sensor embedded within the seat and armrests of wheelchair 400. As an example, these sensors may be pressure or capacitive sensors as discussed above. Occupant 412 is also shown as wearing harness 410. Harness 410 includes various support points for attaching cables 406. The support points on harness 410 may be tailored to the particular support points and cable locations on wheelchair 400, or the support points on harness 400 may be generally located.

Figure 5:
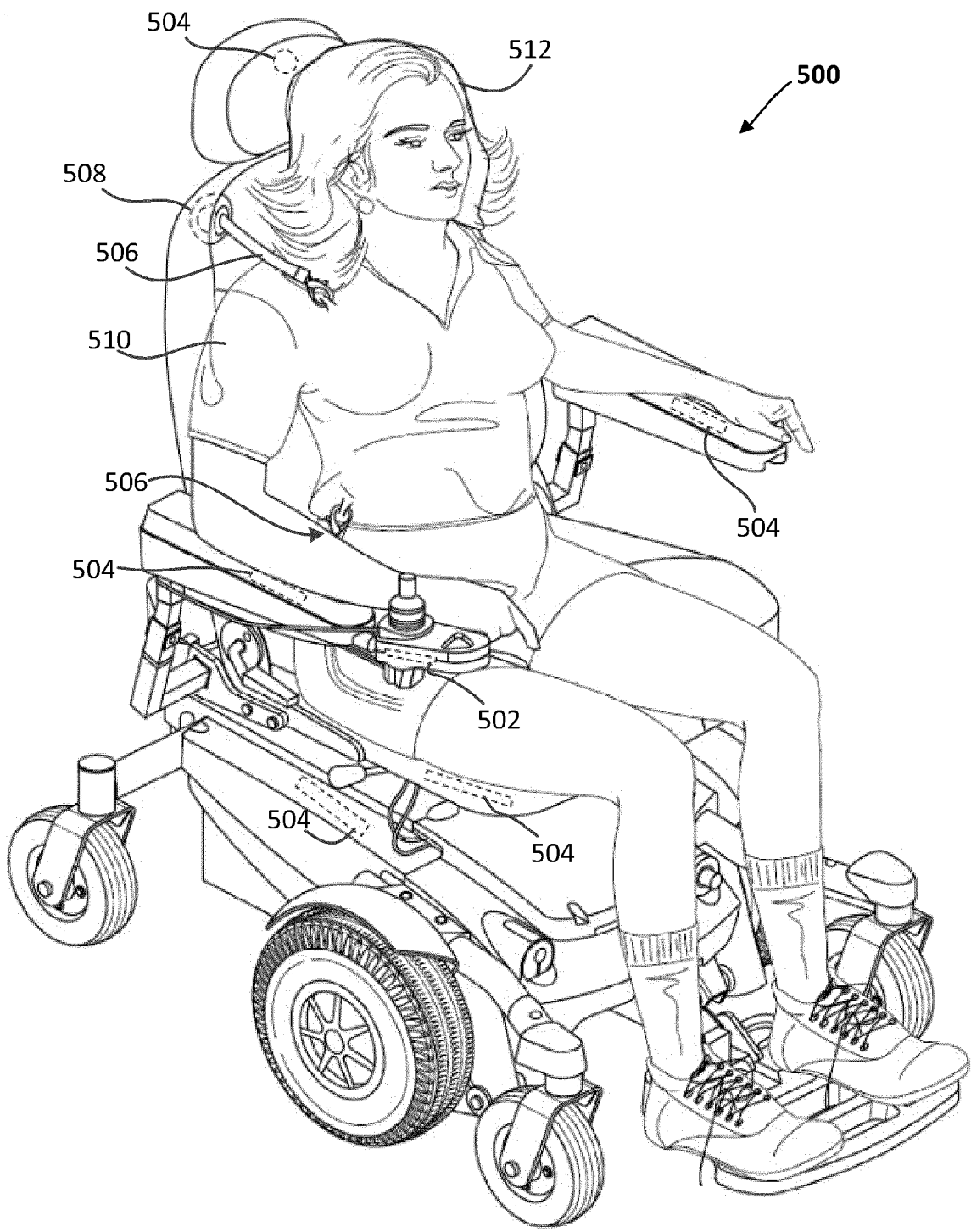
FIG. 5 is a schematic diagram of a wheelchair including a system for adjusting the position of a wheelchair occupant according to one embodiment.

Referring to FIG. 5, a schematic diagram of wheelchair 500 is shown according to one embodiment. Wheelchair 500 has been equipped with the systems described herein and includes processing circuit 502, sensors 504, cables 506, and motor-driven reels 508. Processing circuit 502 is depicted as being part of the control systems of the wheelchair. Sensors 504 include various sensors coupled to wheelchair 500. As depicted, sensors 504 may include a sensor embedded within the seat and armrests of wheelchair 500. As an example, these sensors may be pressure or capacitive sensors as discussed above. Occupant 512 is also shown as wearing shirt 510. Shirt 510 includes various embedded support points for attaching cables 506. Shirt 510 may be a specially designed shirt corresponding to a particular system configuration, or may be a generic shirt including support points for attaching cables 506.

Figure 6:
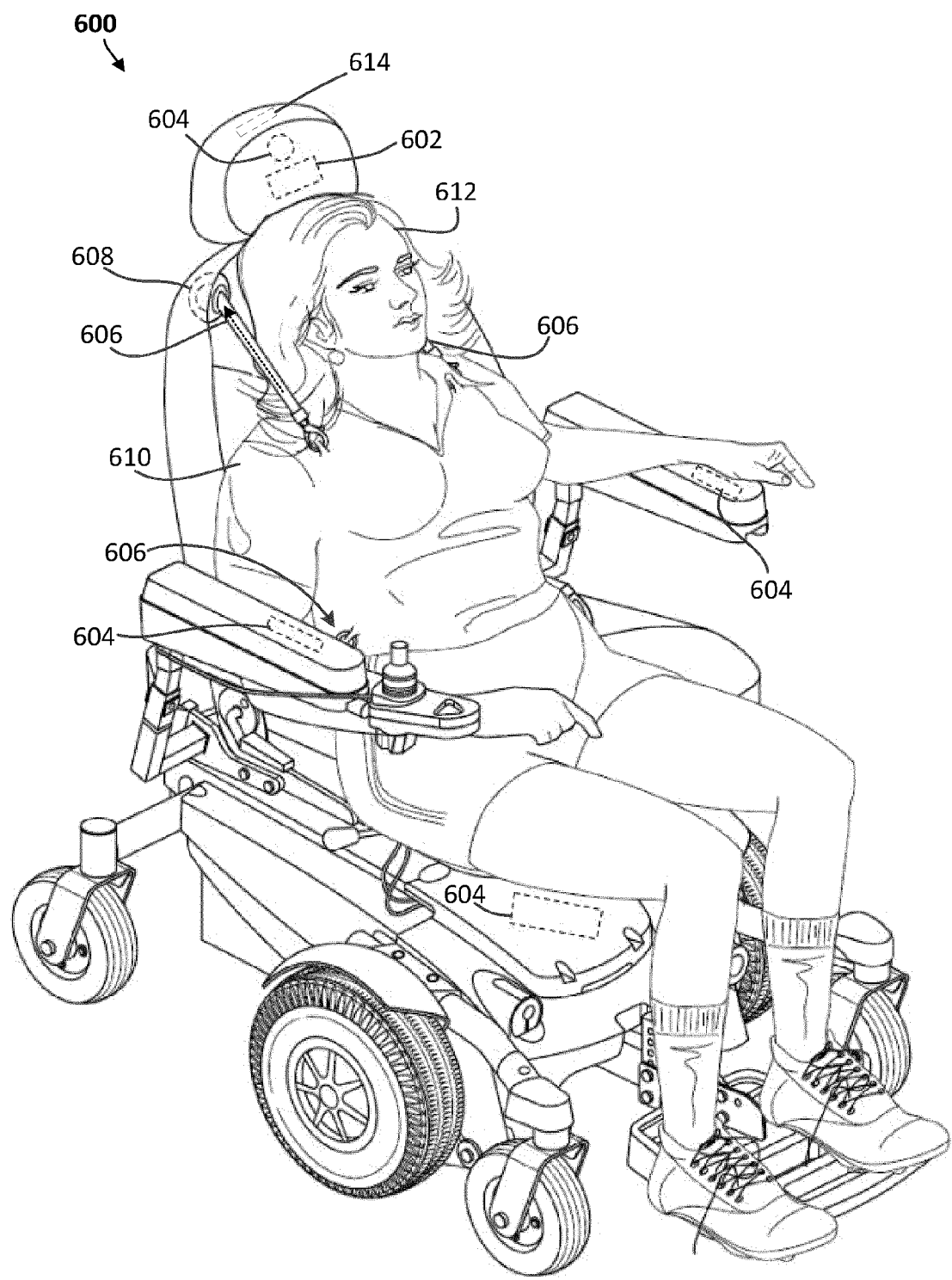
FIG. 6 is a schematic diagram of a wheelchair including a system for adjusting the position of a wheelchair occupant according to one embodiment.

Referring to FIG. 6, a schematic diagram of wheelchair 600 is shown according to one embodiment. Wheelchair 600 has been equipped with the systems described herein and includes processing circuit 602, sensors 604, cables 606, and motor-driven reels 608. Processing circuit 602 is depicted as being embedding within the headrest of wheelchair. Sensors 604 include various sensors coupled to wheelchair 600. As depicted, sensors 604 may include a sensor embedded within the seat and armrests of wheelchair 600. These sensors may be pressure or capacitive sensors as discussed above. Sensors 604 may also include a camera embedding within the top portion of the headrest of the wheelchair.

Occupant 612 is also shown as wearing shirt 610. Shirt 610 includes various embedded support points for attaching cables 606. Occupant 612 is depicted as having slid down within wheelchair 600 to an improper position. The sensor analysis module of processing circuit 602, configured according to an active mode as described herein, detects the improperly positioned occupant 612 and causes motor-driven reels 608 to wind up cables 606 in order to move occupant back to a proper position. Wheelchair 600 also includes transceiver 614. Transceiver 614 may include a wireless networking transceiver, a radio transceiver, a Bluetooth transceiver, etc. Processing circuit 602 generates an alert corresponding to the movement of occupant 612 and sends it to a nurse's terminal via transceiver 614.

Figure 7:
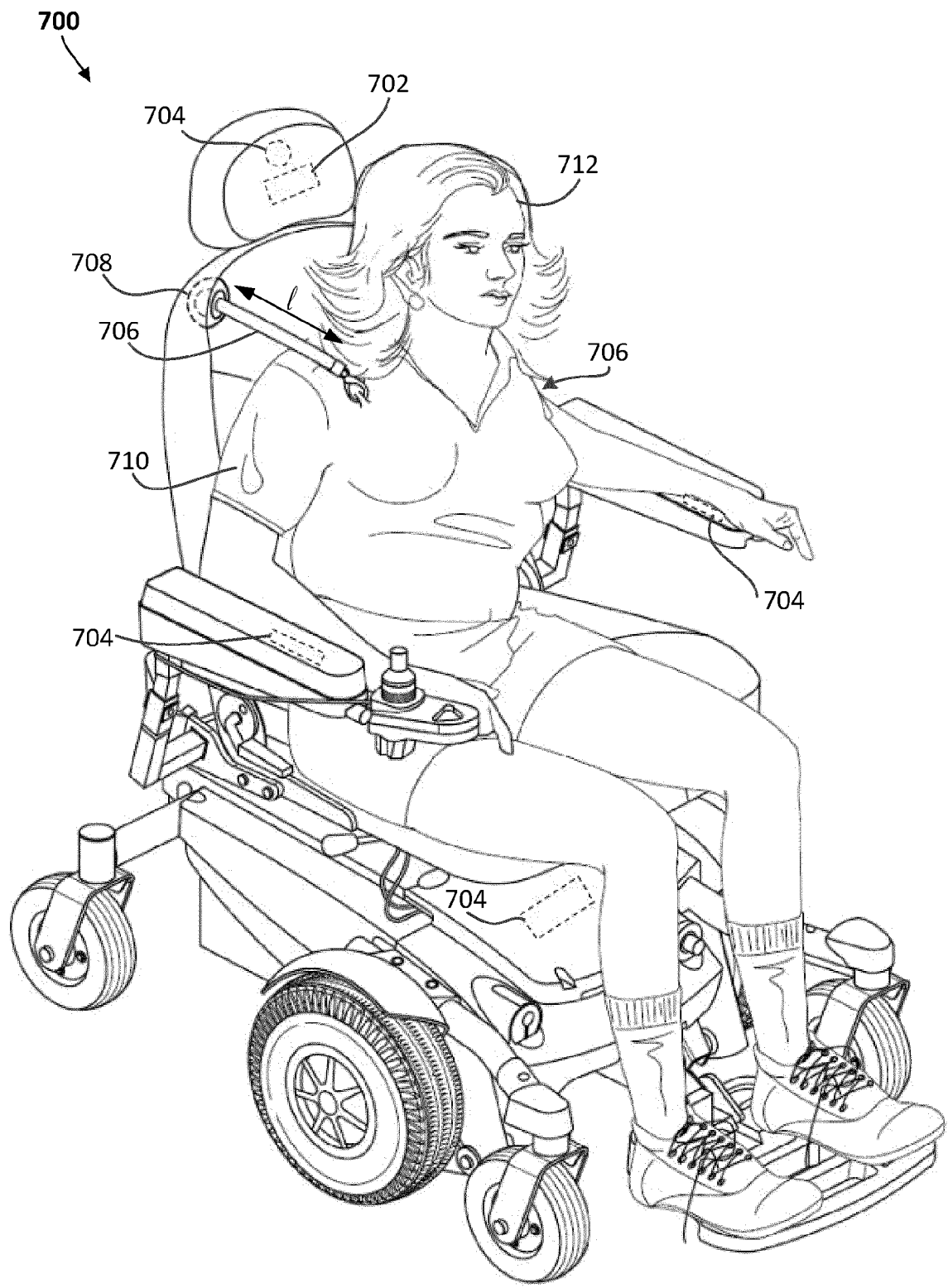
FIG. 7 is a schematic diagram of a wheelchair including a system for adjusting the position of a wheelchair occupant according to one embodiment.

Referring to FIG. 7, a schematic diagram of wheelchair 700 is shown according to one embodiment. Wheelchair 700 has been equipped with the systems described herein and includes processing circuit 702, sensors 704, cables 706, and motor-driven reels 708. Processing circuit 702 is depicted as being embedding within the headrest of wheelchair. Sensors 704 include various sensors coupled to wheelchair 700. As depicted, sensors 704 may include a sensor embedded within the seat and armrests of wheelchair 700. These sensors may be pressure or capacitive sensors as discussed above. Sensors 704 may also include a camera embedded within the top portion of the headrest of the wheelchair. Occupant 712 is also shown as wearing shirt 710. Shirt 710 includes various embedded support points for attaching cables 706. Occupant 712 is depicted as leaning forward in wheelchair 700. The sensor analysis module of processing circuit 702, configured according to a passive mode as described herein controls motor-driven reels 708 to maintain a fixed tension in cables 706. The tension maintains a tautness in cables 706, but provides for a range l of movement of occupant 712, allowing occupant 712 to lean forward as shown. Wheelchair 700 also includes transceiver 714. Processing circuit 702 may use transceiver 714 to send alerts as described herein. Additionally, transceiver 714 may be used to send data to processing circuit 704 (e.g., configuration settings, remote user commands, etc.).

Figure 8:
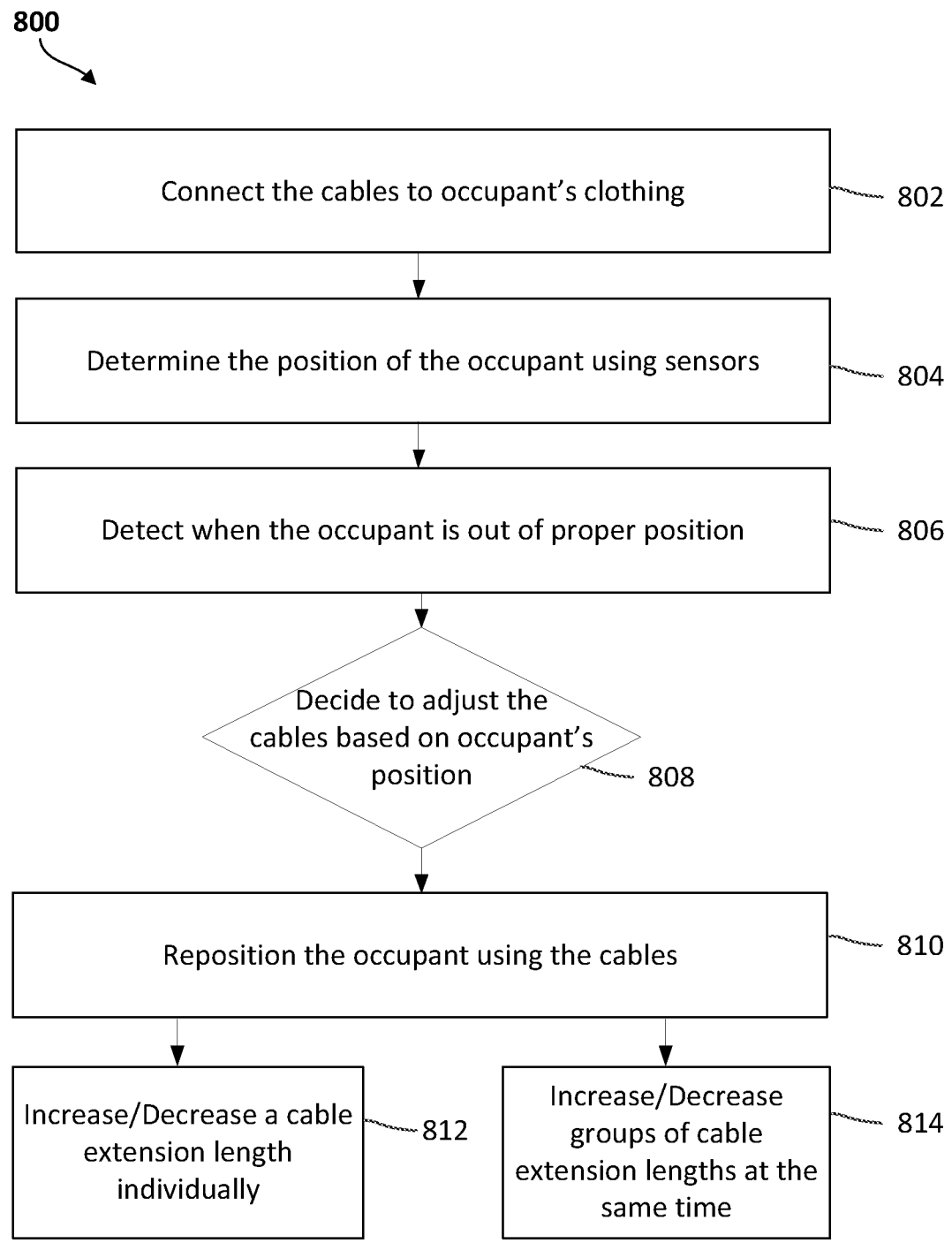
FIG. 8 is a flowchart of a process for adjusting the position of a wheelchair occupant according to one embodiment.

Referring to FIG. 8, a flow diagram of a process 800 for adjusting the position of a wheelchair occupant is shown, according to one embodiment. In alternative embodiments, fewer, additional, and/or different steps may be performed. Also, the use of a flow diagram is not meant to be limiting with respect to the order of steps performed. In step 802, the cables are connected to an occupant's clothing. The clothing may have support/mounting points for the cables integrated at various locations in the clothing. In step 804, the position of the occupant is determined using sensors. The sensors generally provide sensor data related to the position of the occupant. In step 806, an improper position of the occupant is detected. In step 808, based on the position, the occupant may need to be repositioned. In a step 810, the occupant is repositioned by controlling the cables. The cables may be adjusted to increase or decrease in extension length individually (step 812), or the cables may be adjusted at the same time as other cables (step 814). The cables may be adjusted through the use of controllable motor-drive reels affixed to the cables.

Figure 9:
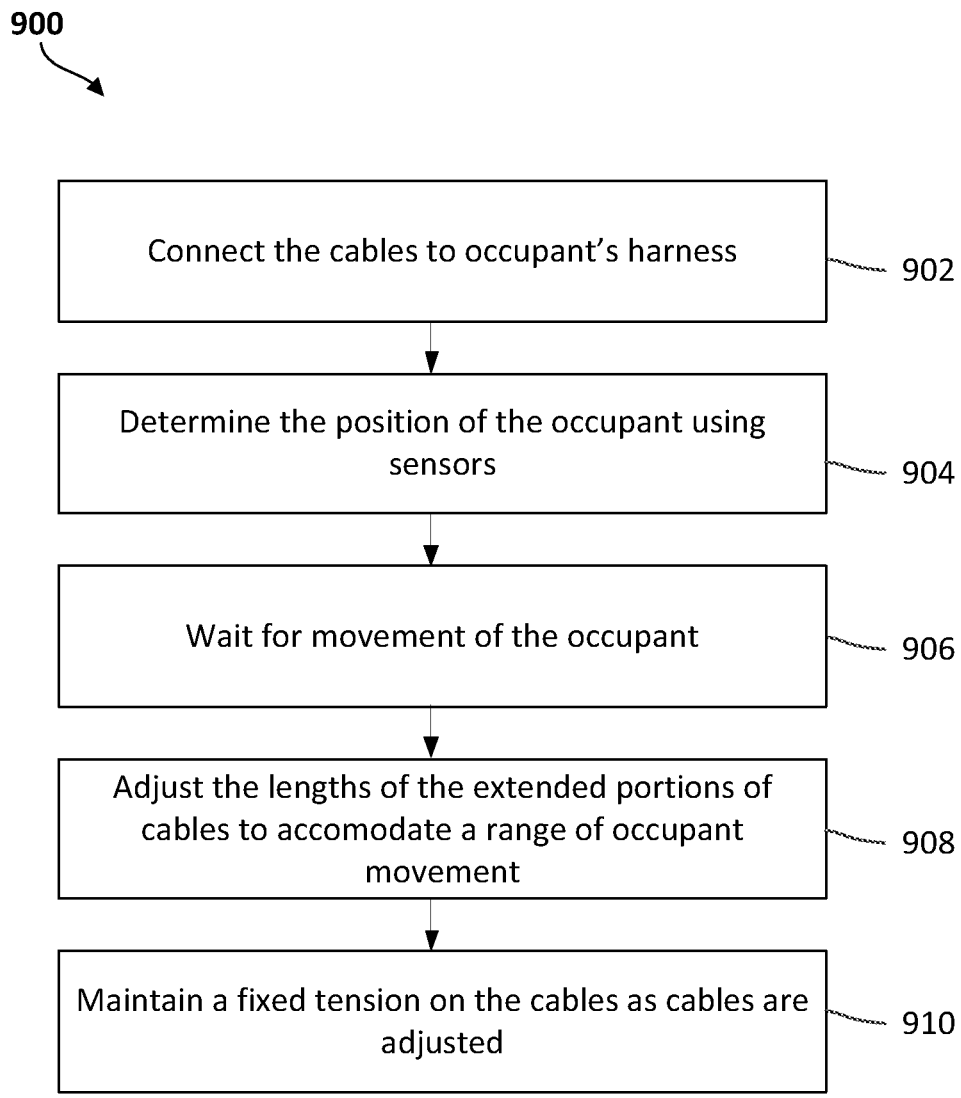
FIG. 9 is a flowchart of a process for adjusting the position of a wheelchair occupant according to one embodiment.

Referring to FIG. 9, a flow diagram of a process 900 for adjusting the position of a wheelchair occupant is shown, according to one embodiment. In alternative embodiments, fewer, additional, and/or different steps may be performed. Also, the use of a flow diagram is not meant to be limiting with respect to the order of steps performed. In step 902, the cables are connected to a harness worn by the occupant. In step 904, the position of the occupant is determined and monitored using sensors. The sensors generally provide sensor data related to the position of the occupant. In step 906, the system waits for movement of the occupant. In step 908, the cables are adjusted to accommodate a range of occupant movement. The range of movement may be specified by user settings or automatically determined. The occupant is not rigidly affixed to the chair and has a freedom of motion. In a step 910, a fixed tension in the cables is maintained. The tension may be specified by user settings or automatically determined. The tension level may be such that motion of the occupant is not impeded, but a sufficient cable tautness is maintained.

Figure 10:
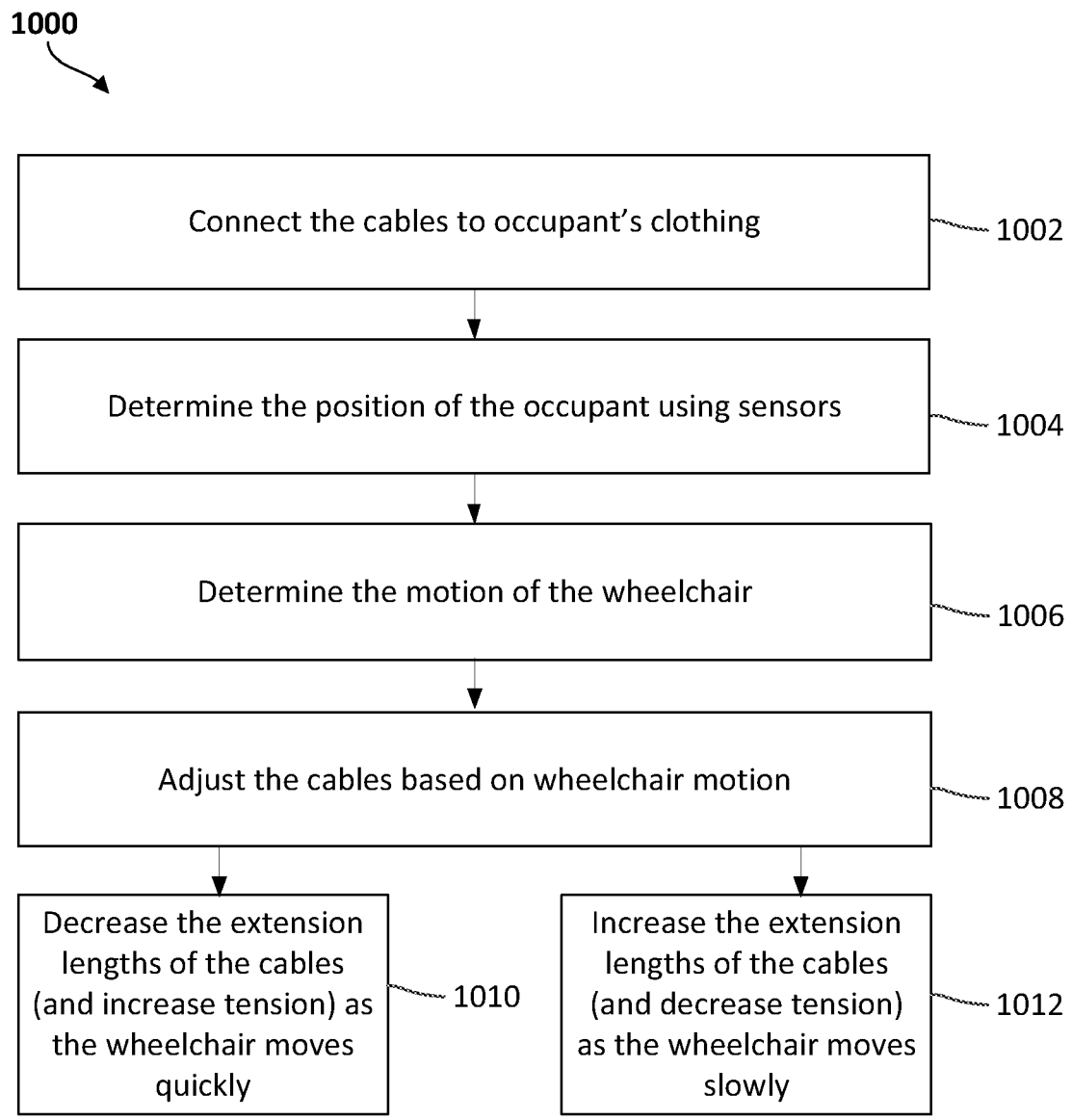
FIG. 10 is a flowchart of a process for adjusting the position of a wheelchair occupant according to one embodiment.

Referring to FIG. 10, a flow diagram of a process 1000 for adjusting the position of a wheelchair occupant is shown, according to one embodiment. In alternative embodiments, fewer, additional, and/or different steps may be performed. Also, the use of a flow diagram is not meant to be limiting with respect to the order of steps performed. In step 1002, the cables are connected to an occupant's clothing. The clothing may have support/mounting points for the cables integrated at various locations in the clothing. In step 1004, the position of the occupant is determined and monitored using sensors. The sensors generally provide sensor data related to the position of the occupant. In step 1006, the motion of the wheelchair is determined. The wheelchair motion may be provided by speed sensors, motion sensors, accelerometers, gyroscopes, etc. In step 1008, the cables are adjusted based on the wheelchair motion and the occupant's position. The cables may be adjusted to decrease the extended portion in length, and thereby increase the tension of the cable as the wheelchair moves quickly or turns, etc. (step 1010). In this manner the occupant's position may be maintained during movements otherwise likely to cause the occupant's position to shift. The cables may also be adjusted to increase the extended portion in length, and thereby decrease the tension of the cables as the wheelchair moves slowly (step 1012). In this manner, the occupant may enjoy an increased freedom of motion when the occupant is less likely to shift in position.

Figure 11:
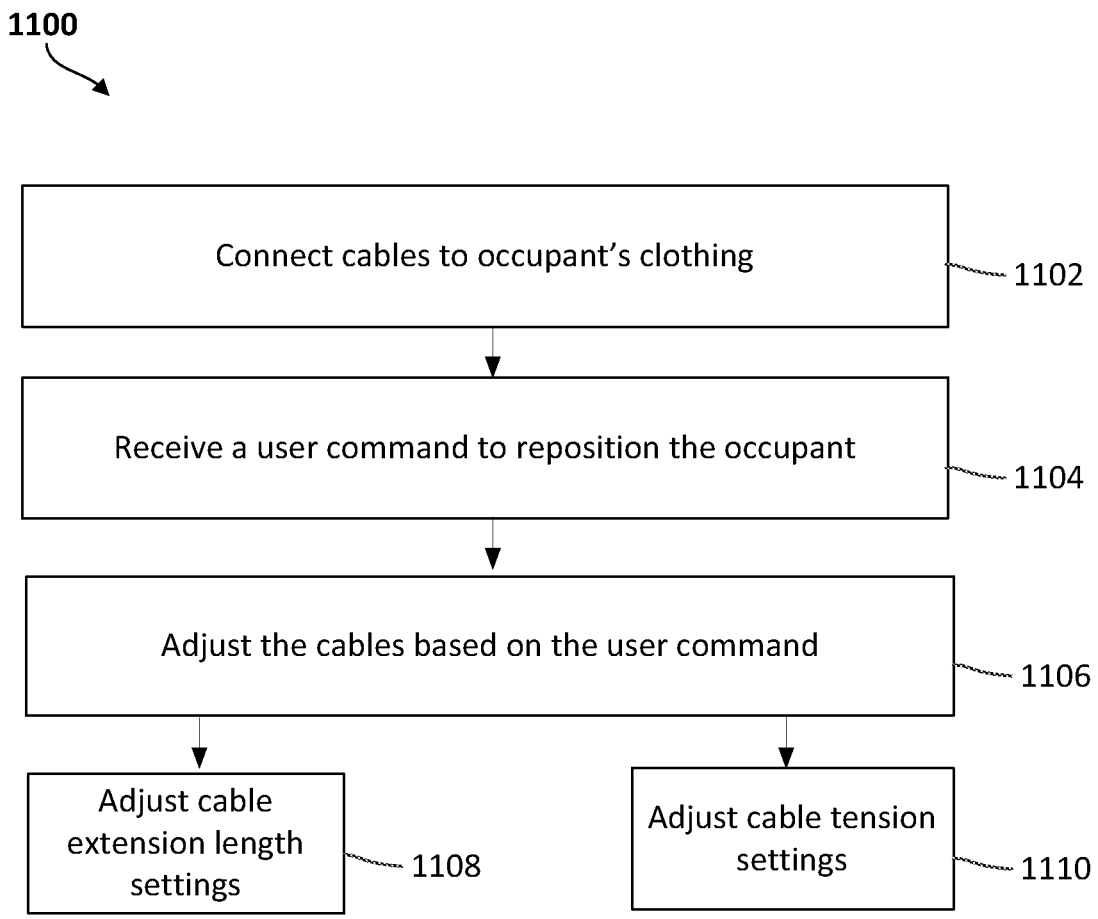
FIG. 11 is a flowchart of a process for adjusting the position of a wheelchair occupant according to one embodiment.

Referring to FIG. 11, a flow diagram of a process 1100 for adjusting the position of a wheelchair occupant is shown, according to one embodiment. In alternative embodiments, fewer, additional, and/or different steps may be performed. Also, the use of a flow diagram is not meant to be limiting with respect to the order of steps performed. In step 1102, the cables are connected to an occupant's clothing. In step 1104, a user command to reposition the occupant is received. The user command may be entered via an interface on the wheelchair or may be sent remotely (e.g., from a nurse's terminal, etc.). In step 1106, the cables are adjusted based on the user command. The user command may be specific a desired position of the occupant, cable lengths, cable tension values, and other settings. The cable extension lengths may then be adjusted (step 1108) and the cable tensions may be adjusted (1110).

Figure 12:
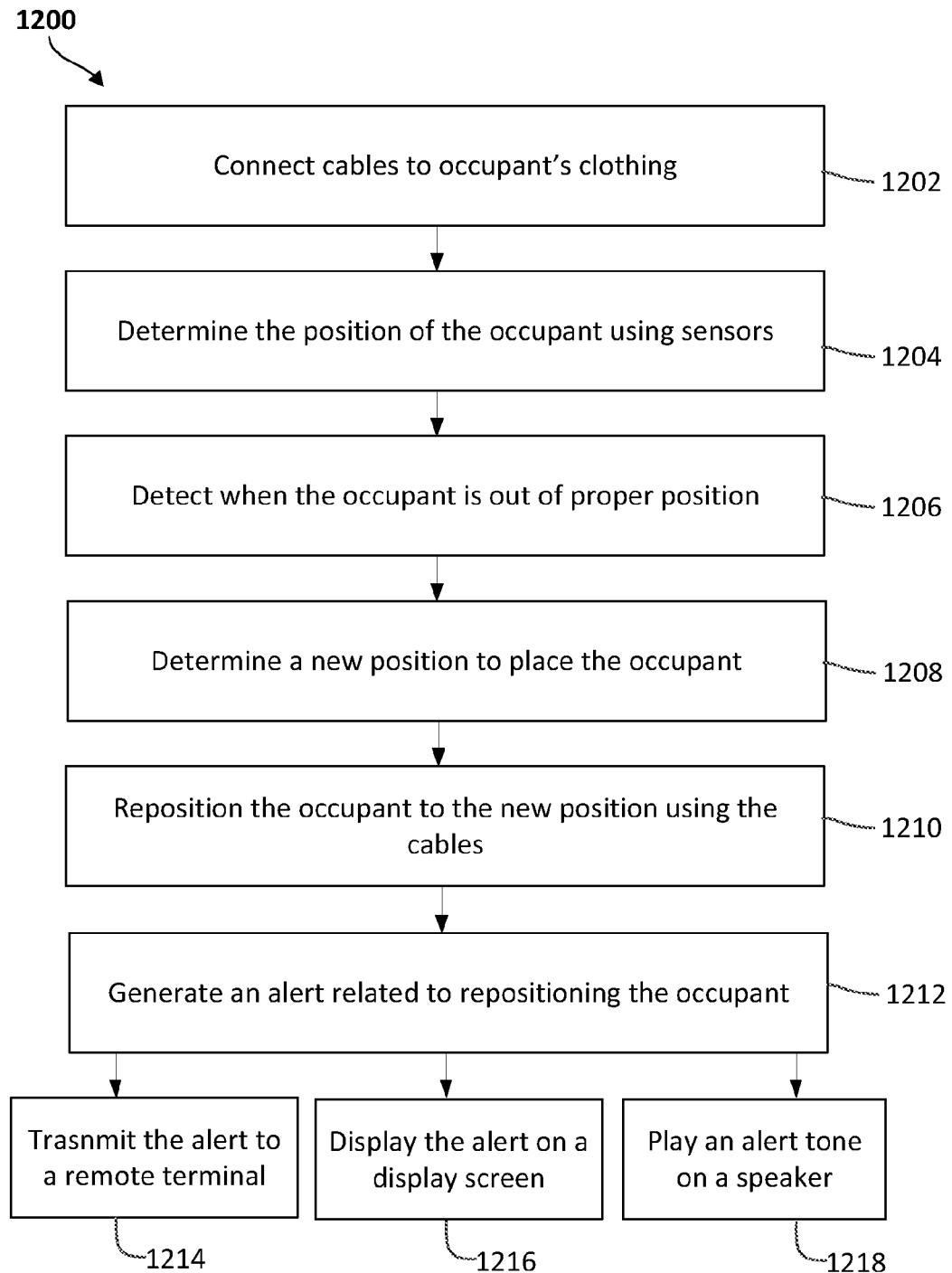
FIG. 12 is a flowchart of a process for adjusting the position of a wheelchair occupant according to one embodiment.

Referring to FIG. 12, a flow diagram of a process 1200 for adjusting the position of a wheelchair occupant is shown, according to one embodiment. In alternative embodiments, fewer, additional, and/or different steps may be performed. Also, the use of a flow diagram is not meant to be limiting with respect to the order of steps performed. In step 1202, the cables are connected to an occupant's clothing. In step 1204, the position of the occupant is determined and monitored using sensors. The sensors generally provide sensor data related to the position of the occupant. In step 1206, an improper position of the occupant is detected. In step 1208, a new position for the occupant is determined. In step 1210, the occupant is repositioned to the new position by controlling the cables. In step 1212, an alert is generated related to repositioning the occupant. The alert may be transmitted to a remote terminal (step 1214) via wired or wireless means. The alert may also be displayed on a display screen coupled to the wheelchair (step 1216), or an audio alert tone may be played on a speaker coupled to the wheelchair (step 1218).

Figure 13:
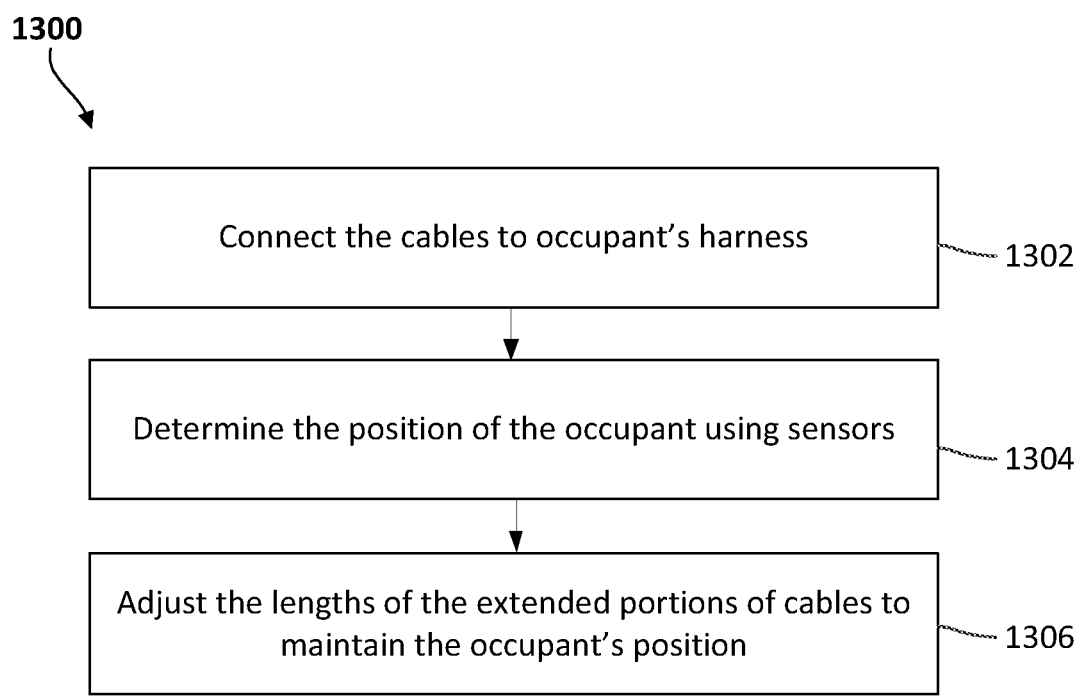
FIG. 13 is a flowchart of a process for adjusting the position of a wheelchair occupant according to one embodiment.

Referring to FIG. 13, a flow diagram of a process 1300 for adjusting the position of a wheelchair occupant is shown, according to one embodiment. In alternative embodiments, fewer, additional, and/or different steps may be performed. Also, the use of a flow diagram is not meant to be limiting with respect to the order of steps performed. In step 1302, the cables are connected to an occupant's harness. In step 1304, the position of the occupant is determined using sensors. The sensors generally provide sensor data related to the position of the occupant. In step 1306, the extended portion of the cables are adjusted to maintain the occupant in his or her current position. In this manner, the occupant's position may be maintained when the occupant is in a proper position.

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Although the present disclosure discusses embodiments including a controllable motor-driven reel that adjusts a cable, other cable adjustment systems are envisioned (e.g., a rack and pinion system, a lever-based system). Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for adjusting a position of a wheelchair occupant, comprising:
  a sensor configured to generate sensor data based on the position of the occupant in the wheelchair, the sensor data indicative of a distance a body part of the occupant is from a reference point on the wheelchair;
  an adjustable cable system coupled to a support point on the wheelchair and configured to be coupled to a support point on the occupant's clothing, wherein the cable system is configured to extend and retract at least one cable to adjust the position of the occupant; and
  a processing circuit configured to:
    determine the position of the occupant in the wheelchair based on the sensor data, wherein determining the position of the occupant includes comparing the position of the occupant to a defined position in order to determine a misalignment of the occupant, and wherein comparing the position of the occupant to the defined position includes determining whether the distance the body part of the occupant is from the reference point on the wheelchair is greater than a threshold; and
    selectively extend or retract the cable to adjust the position of the occupant in the wheelchair based on the determined position of the occupant, and an inertial force of at least one of the wheelchair occupant and the wheelchair calculated by the processing circuit based on a motion of the wheelchair, wherein adjusting the position of the occupant includes reducing the distance the body part of the occupant is from the reference point.

2. The system of claim 1, wherein the defined position is a proper position, and the processing circuit is configured to adjust the cable to move the occupant towards the proper position.

3. The system of claim 1, wherein the defined position is an improper position, and the processing circuit is configured to adjust the cable to move the occupant away from the improper position; and wherein the defined position is customized based on a biometric of the wheelchair occupant.

4. The system of claim 1, wherein adjusting the cable is further based on a speed of the wheelchair.

5. The system of claim 1, wherein adjusting the at least one cable is further based on a motion of the wheelchair.

6. The system of claim 5, wherein the motion is a predicted motion based on a map indicating at least one of a pathway, a doorway, and an obstacle.

7. The system of claim 1, wherein adjusting the cable is further based on a tension of the cable, and wherein the tension is based on feedback from a stress sensor.

8. The system of claim 7, wherein the cable is adjusted according to a passive mode, and wherein adjusting the cable according to the passive mode includes increasing or decreasing a length of the cable to allow a range of movement of the occupant.

9. The system of claim 8, wherein adjusting the cable according to the passive mode includes increasing or decreasing a length of the cable to maintain a defined tension of the cable.

10. The system of claim 7, wherein the cable is adjusted according to an active mode, and wherein adjusting the cable according to the active mode includes decreasing a length of the cable in order to move the occupant, and wherein the length is decreased based on a defined tensile limit.

11. The system of claim 1, wherein the sensor includes a camera configured to acquire image data; and
wherein the processing circuit is configured to determine the position of the wheelchair occupant by implementing a body detection algorithm on the image data.

12. The system of claim 1, wherein the sensor is integrated along a perimeter of the wheelchair and configured to provide a signal to the processing circuit based on a body part of the occupant protruding outside a contour of the wheelchair.

13. The system of claim 1, wherein the sensor includes a plurality of RFID sensors disposed along a perimeter of the wheelchair, wherein at least one RFID tag is coupled to the occupant, and wherein the processing circuit is configured to determine a distance from the at least one RFID tag to the plurality of RFID sensors.

14. The system of claim 1, wherein the sensor includes a pressure sensor configured to generate pressure data at a particular location on the wheelchair, and wherein the sensor data includes the pressure data.

15. A method of adjusting a position of a wheelchair occupant, comprising:
connecting an elongate material adjustment system to clothing of the occupant, wherein the elongate material adjustment system is coupled to a support point on the wheelchair and configured to be coupled to a support point on the occupant's clothing, and wherein the elongate material adjustment system is configured to extend and retract at least one elongate material to adjust the position of the occupant;
generating sensor data with a sensor, wherein the sensor data is based on the position of the occupant in the wheelchair, and wherein the sensor data is indicative of a distance a body part of the occupant is from a reference point on at least one of a seat portion and a backrest portion of the wheelchair;
determining the position of the occupant in the wheelchair based on the sensor data, wherein determining the position of the occupant includes comparing the position of the occupant to a defined position in order to determine a misalignment of the occupant, wherein the misalignment of the occupant is based on a location of a body part within the wheelchair, and wherein comparing the position of the occupant to the defined position includes determining whether the distance the body part of the occupant is from the reference point on the at least one of the seat portion and the backrest portion of the wheelchair is greater than a threshold;
selectively retracting the elongate material to adjust the position of the occupant in the wheelchair based on the determined position of the occupant, wherein adjusting the position of the occupant includes reducing the distance the body part of the occupant is from the reference point on the at least one of the seat portion and the backrest portion of the wheelchair; and
automatically disconnecting, without human intervention, the elongate material adjustment system from the clothing of the occupant based on determining that the wheelchair is at least one of stationary for a threshold period of time and at a destination.

16. The method of claim 15, further comprising adjusting the elongate material to move the occupant towards a proper position, wherein the defined position is the proper position.

17. The method of claim 15, further comprising adjusting the elongate material to move the occupant away from an improper position, wherein the defined position is the improper position.

18. The method of claim 15, wherein adjusting the elongate material is further based on a speed of the wheelchair.

19. The method of claim 15, wherein adjusting the elongate material is further based on a motion of the wheelchair.

20. The method of claim 19, wherein the motion is an angular motion.

21. The method of claim 15, wherein adjusting the elongate material is further based on a tension of the elongate material, and wherein the tension is based on feedback from a stress sensor.

22. The method of claim 21, wherein the elongate material is adjusted according to a passive mode, and wherein adjusting the elongate material according to the passive mode includes increasing or decreasing a length of the elongate material to allow a range of movement of the occupant.

23. The method of claim 22, wherein adjusting the elongate material according to the passive mode includes increasing or decreasing a length of the elongate material to maintain a defined tension of the elongate material.

24. The method of claim 23, wherein the defined tension is selected in order to maintain tautness but not impede movement of the occupant.

25. The method of claim 21, wherein the elongate material is adjusted according to an active mode, and wherein adjusting the elongate material according to the active mode includes decreasing a length of the elongate material in order to move the occupant, and wherein the length is decreased based on a defined tensile limit.

26. The method of claim 25, wherein the tensile limit is defined in real-time based on feedback from a stress sensor.

27. The method of claim 15, further comprising generating an alert using a feedback device, wherein the warning is based on the position of the occupant.

28. A non-transitory computer-readable medium having instructions stored thereon, the instructions forming a program executable by a processing circuit to adjust a position of a wheelchair occupant, the instructions comprising:
instructions for receiving sensor data from a sensor, wherein the sensor data is based on the position of the occupant in the wheelchair, and wherein the sensor data is indicative of a distance a body part of the occupant is from a reference point on at least one of a seat portion and a backrest portion of the wheelchair;

instructions for determining the position of the occupant in the wheelchair based on the sensor data, wherein determining the position of the occupant includes comparing the position of the occupant to a defined position in order to determine a misalignment of the occupant, and wherein comparing the position of the occupant to the defined position includes determining whether the distance the body part of the occupant is from the reference point on the at least one of the seat portion and the backrest portion of the wheelchair is greater than a threshold;

instructions for controlling an elongate material adjustment system to selectively retract an elongate material to adjust the position of the occupant in the wheelchair based on the determined position of the occupant and further based on an impending motion of the wheelchair, wherein the elongate material adjustment system is coupled to a support point on the wheelchair and configured to be coupled to a support point on the occupant's clothing, and wherein the elongate material adjustment system is configured to extend and retract at least one elongate material to adjust the position of the occupant to reduce the distance the body part of the occupant is from the reference point on the at least one of the seat portion and the backrest portion of the wheelchair while keeping the occupant in direct physical contact with the at least one of the seat portion and the backrest portion of the wheelchair; and instructions for comparing the position of the occupant to dimensions of the wheelchair, wherein the dimensions for the wheelchair are based on a model of the wheelchair accessible by the processing circuit, and wherein the model of the wheelchair is pre-stored or determined by the processing circuit in real-time.

29. The non-transitory computer-readable medium of claim 28, wherein determining the position of the occupant includes comparing the position of the occupant to a defined position in order to determine a misalignment of the occupant.

30. The non-transitory computer-readable medium of claim 29, wherein the instructions further comprise instructions for adjusting the elongate material to move the occupant towards a proper position, wherein the defined position is the proper position.

31. The non-transitory computer-readable medium of claim 29, wherein the instructions further comprise instructions for adjusting the elongate material to move the occupant away from an improper position, wherein the defined position is the improper position.

32. The non-transitory computer-readable medium of claim 28, wherein adjusting the elongate material is further based on a tension of the elongate material that is based on feedback from a stress sensor, wherein the elongate material is adjusted according to a passive mode, and wherein adjusting the elongate material according to the passive mode includes increasing or decreasing a length of the elongate material to allow a range of movement of the occupant.

33. The non-transitory computer-readable medium of claim 32, wherein adjusting the elongate material according to the passive mode includes increasing or decreasing a length of the elongate material to maintain a defined tension of the elongate material.

34. The non-transitory computer-readable medium of claim 28, wherein adjusting the elongate material is further based on a tension of the elongate material that is based on feedback from a stress sensor, wherein the cable is adjusted according to an active mode, and wherein adjusting the elongate material according to the active mode includes decreasing a length of the elongate material in order to move the occupant, and wherein the length is decreased based on a defined tensile limit.

* * * * *